United States Patent [19]
Hirao et al.

[11] 3,994,363
[45] Nov. 30, 1976

[54] COMPOSITE NOISE ABSORPTION PRODUCT

[75] Inventors: Kazuma Hirao; Shigeyuki Narisawa; Tsuneji Ishii, all of Yokohama, Japan

[73] Assignee: Asahi Glasss Co., Ltd., Tokyo, Japan

[22] Filed: Aug. 4, 1975

[21] Appl. No.: 601,828

[30] Foreign Application Priority Data
Aug. 2, 1974  Japan............................... 49-88017

[52] U.S. Cl. .............................................. 181/33 G
[51] Int. Cl.² ........................................ G10K 11/02
[58] Field of Search ...................... 181/33 G, 33 GA

[56] References Cited
UNITED STATES PATENTS

| | | |
|---|---|---|
| 2,237,032 | 4/1941 | Haux............................. 181/33 GA |
| 3,197,356 | 7/1965 | Campbell....................... 181/33 G X |
| 3,239,973 | 3/1966 | Hannes et al.................. 181/33 G X |
| 3,243,340 | 3/1966 | Cadotte.......................... 181/33 GA |
| 3,328,086 | 6/1967 | Johnston......................... 181/33 G |
| 3,658,633 | 4/1972 | Jumentier et al. .......... 181/33 GA X |

*Primary Examiner*—Lawrence R. Franklin
*Attorney, Agent, or Firm*—Oblon, Fisher, Spivak, McClelland & Maier

[57] ABSTRACT

A hard board containing a fiber web and a thermoplastic resin which composite is used as a noise absorption product is improved in that the surface and spaces between the fiber web are covered and filled with the resin, and wherein a plurality of finely formed crevices is formed in the resin covering the surface of the composite.

10 Claims, 3 Drawing Figures

COMPOSITE NOISE ABSORPTION PRODUCT

BACKGROUND OF THE INVENTION

1. Field of the Invention

The present invention relates to a thin composite noise absorption product which is characterized by high noise reduction, high rigidity and high strength. More particularly, it relates to a composite noise absorption product formed with a hard board of a fiber web and a thermoplastic resin.

2. Description of the Prior Art

Soundproofing devices such as soundproofing walls are widely used to reduce the noise level in offices, houses, apartments, etc. Various materials have been used as the noise absorber in such soundproofing constructions. Very often, inorganic fibrous materials, such as glass fiber asbestos and ceramic fibers, have been widely used in the form of mats, cloths or the like for this purpose. Conventional noise absorption products are prepare by bonding the fibers with a small amount of a binder to form a mat or a cloth having a plurality of coarse voids between fibers to provide high noise absorption characteristics. These noise absorption products are usually used in combination with sound insulating materials, such as metals, plastics, concrete or the like. However, these conventional noise absorption products made of a bonded fiber web have significant disadvantages. For one, they are characterized by low rigidity, low strength and are bulky. Accordingly, it is difficult to fabricate a thin hard board as a noise absorption product or to mold the material into certain shapes, such as that of a three dimensionally surfaced board.

As a result, it is necessary to use a yoke or a frame for construction of a soundproofing wall or the like. Moreover, the coarse voids between the fibers of these conventional bonded fiber webs produce products having a high water absorption property. When water is absorbed and the voids are filled, the noise absorption characteristics are greatly decreased. Moreover, it is difficult to remove the water. Accordingly, it is not advantageous to use such a bonded fiber web as a noise absorption product outdoors under conditions where exposure to water, such as from rainfall, is likely. Another disadvantage is that these conventional bonded webs have low adhesive strength and are easily deformed since the amount of the binder in the bonded fiber web is small. Furthermore, when the bonded fiber web is wet or has been exposed to sunlight for a long period of time, the binder becomes deteriorated and the fibers loosen, deforming the product. Consequently, there exists a need for an improved soundproofing material.

SUMMARY OF THE INVENTION

Accordingly, it is one object of this invention to provide a composite noise absorption product as a thin board which has high rigidity, high strength and low water absorption capabilty, and which can be easily dried in a short time once water is absorbed.

It is another object of this invention to provide a composite noise absorption product wherein the thermoplastic resin contained therein is firmly bonded to the fibers whereby deformation is prevented.

It is still another object of this invention to provide a composite noise absorption product which can be easily shaped by a secondary processing operation, whereby the noise absorption product can maintain a desirable shape which imparts higher noise absorption characteristics, such as that of permanently waved thin flat board.

It is yet another object of this invention to provide a composite noise absorption product which has a special acoustic absorption system which is quite different from that of the conventional noise absorption products having a bonded fiber web.

It is still further an object of this invention to provide a process for preparing such a composite noise absorption product.

Briefly, these and other objects of the invention as will hereinafter be made clear from the ensuing discussion have been attained by providing a composite as a noise absorption product which is improved in that the surface and spaces between a fiber web are covered and filled with a resin, and wherein a plurality of finely formed crevices is formed in the resin covering the surface of the composite.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
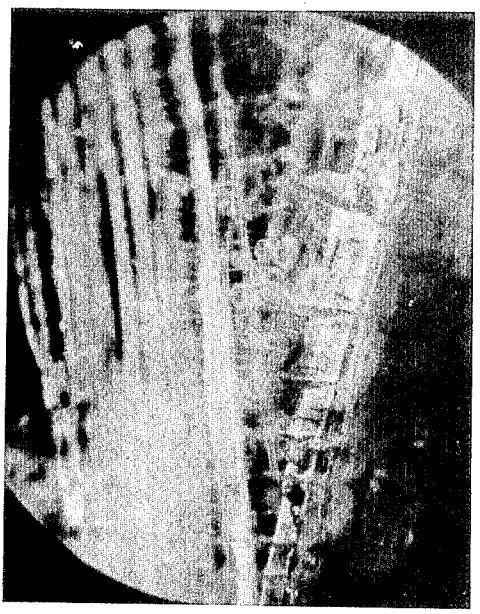
FIG. 1 shows a photograph of the surface of the sound absorption product of this invention ( $\times$ 35)

The noise absorption product of this invention is a composite made of two basic materials: a fiber web as the reinforcing material, and a thermoplastic resin as the matrix. The surface of the composite is substantially made of the thermoplastic resin. A plurality of fine cracks are formed in this thermoplastic resin of the surface, thereby rendering the composite sound absorbent. The appearance of the product is similar to that of a thermoplastic resin board reinforced with a fiber which has a rough surface, and to that of a thin hard board. Many uneven positions are irregularly formed on the surface because of unevenness of the fiber web under the surface. The surface is substantially covered with the thermoplastic resin so that the underlying fiber is not exposed above the resin. In the inner portions, the fibers and the thermoplastic resin are substantially bonded, filling the space between fibers with the thermoplastic resin. Accordingly, the many voids between the fibers which are necessary to provide absorption characteristics in conventional bonded fibers are not present. In the noise absorption product of this invention, the many fine cracks formed on the surface of the thermoplastic resin impart the noise absorption characteristics. The noise absorption product of this invention is a thin hard board having high rigidity, high strength and low water absorption characteristics. If water is absorbed, it can be removed easily in a short period of time. The noise absorption product of this invention can also be easily shaped by a secondary processing operation, just as a thermoplastic board reinforced with fibers can be used in any desirable permanent shape. In the secondary processsing operation, the fine cracks in the surface should be maintained.

The composite noise absorption product of this invention preferably contains 15 – 70 wt%, i.e., percent by weight, of the fiber web and 30 – 85% of the thermoplastic resin. When the amount of the fiber web is greater than 70 wt%, it is difficult to cover the surface with the thermoplastic resin and at the same time to fill the spaces between the fibers with the resin, without also leaving many fibers exposed on the surface. When the amount of the thermoplastic resin is less than 5 wt%, the superior characteristics of this invention are not produced because the resultant product is similar to the noise absorption product of a bonded fiber web. The amount of the binder used for a conventional noise absorption product such as a glass fiber web is usually less than 5 wt% and is not more than 20 wt%. When the amount of the fiber web is less than 15 wt%, the number of fine crevices on the surface is decreased thereby decreasing the noise reduction coefficient. Also, the reinforcing effect of the fiber on the thermoplastic resin is low and the strength of the product is low. It is especially preferred to use 25 – 60 wt% of the fiber web and 40 – 75 wt% of the thermoplastic resin in the noise absorption product.

The noise absorption product of this invention is a thin hard board which has low permeability to liquid and gas. The thickness of the product is not critical and is usually less than 5 mm, preferably 3 - 0.1 mm. The porosity of the product is also not critical and is usually 80 - 10%, preferably 60 – 20%. Additionally, the apparent specific gravity is not critical and is usually more than 0.4 g/cm$^3$, especially 0.6 – 1.2 g/cm$^3$. The porosity of the product of this invention is lower and the apparent specific gravity is higher as compared with those of the conventional noise absorption products of a bonded fiber web which usually have a porosity of more than 95%, especially more than 99%, and an apparent specific gravity of less than 0.05 g/cm$^3$, especially about 0.02 g/cm$^3$, as a glass fiber web.

Figure 2:
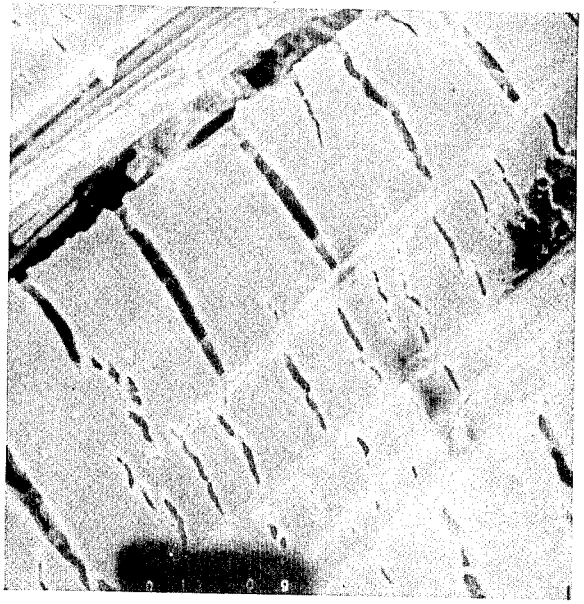
FIG. 2 shows a photograph of the surface of the sound absorption product of this invention ( $\times$ 500)

The surface fine structure of the noise absorption product of this invention is shown in FIGS. 1 and 2. The product in these figures comprises a glass fiber chopped strand mat as the fiber web and polyvinyl chloride resin as the thermoplastic resin matrix. FIG. 1 shows a photograph of the surface of the product taken with a microscope (35 times). The glass fiber strands are disposed in the vertical direction and the surface of the strand and the space between fibers are covered with transparent polyvinyl chloride resin. On the surface of the polyvinyl chloride, especially on the surface of the polyvinyl chloride covering the strands, many fine cracks are formed in the direction vertical to the strands. FIG. 2 is a photograph of the surface of the same product enlarged 500 times by a scanning electron microscope. The filaments of the strands are disposed from the left lower position to the right upper position. Many fine cracks which could not be seen in FIG. 1, are disposed on the surface of the resin covering the strand in the direction substantially vertical to the filaments. The filaments in the fine cracks are exposed but the other filaments are covered by the resin. The general characteristic of the fine structure of the product of this invention is to form most of the fine cracks in the direction vertical to the fibers as shown in the Figures. The cracks are deep but do not communicate all the way through the thin product. The cracks are disposed over the entire surface of the product without uniform distribution. More cracks are located on the surface portions above the fibers than are on the portions above the space between the fibers. The length of the cracks is less than about 0.5 mm, especially less than 0.1 mm. The width of the cracks is less than 0.1 mm, especially less than 0.01 mm. The number of cracks having a width of 0.01 – 0.001 mm is usually more than 1000, preferably more than 10,000 per 1 cm$^2$. The number of cracks having a width of more than 0.01 mm can be zero but is preferably more than 100 per 1 cm$^2$. Such crevices are fine and have a small volume, whereby the water absorption is low, the water permeating into the product is small and the product is easily dried.

The mechanism of the noise absorption characteristics of the product is considered to reside in sound wave capture in the many fine cracks on the surface of the product. Accordingly, the mechanism is quite different from that whereby the voids of the fibers of the bonded fiber web impart the noise absorption characteristics. The fiber web itself does not impart the noise absorption characteristics in the product of this invention. The fiber web increases the strength of the product and increases its surface area by forming significant unevenness on the surface of the product thereby increasing the number of the fine cracks. The fiber web also contributes to the formation of the fine cracks on the surface of the product. Another factor causing the noise absorption properties of the product is considered to be the vibrational characteristics of the product. The thin board vibrates so as to absorb acoustic energy. The conventional noise absorption product of a bonded fiber web has no rigidity even though it is thin. Accordingly, no vibration of the web arises and no contribution from this source exists. This difference in the noise absorption mechanisms produces different noise absorption characteristics in the low frequency bands. It has been known that the conventional bonded fiber web has quite low noise absorption characteristics to sounds of lower than 500 Hz. However, the product of this invention has effective noise absorption characteristics to sound of lower than 500 Hz without a decrease in the characteristics at this frequency. The noise absorption characteristics of the product of this invention can be further improved selecting a desirable shape. For example, a waved product produces a low amount of reflected acoustic energy because a sound wave reflected by one surface of the waved product then impinges upon other surfaces many times. The product of the invention can be desirably shaped into such a configuration by a suitable secondary processing operation.

The fiber web of the invention is a nonwoven web. It is usually preferred to use a fiber web which is not needle-punched and contains many random groups of parallel filaments (10 – 1000 filaments, especially 40 – 200 filaments in each group). Suitable fibers for the fiber web of this invention include fibers such as natural fibers, synthetic fibers and inorganic fibers. Especially preferred are the inorganic fibers which have a high weather durability and high strength. Suitable inorganic fibers include glass fibers, asbestos fibers, ceramic fibers, carbon fibers, metallic fibers and the like. Glass fiber is especially preferred from the viewpoints of strength and cost. The shape of the fibers is not critical and for example, in the case of glass fibers, fiber webs in the form of a mat, a cloth, a wool, a roving, a roving cloth, a chopped strand, a chopped strand mat, a continuous strand mat, a surfacing mat and the like can be used. Suitable thermoplastic resins for use as the matrix of this invention include various resins and preferably vinyl resins, vinylidene halide resins, vinyl acetate resins, acrylate resins, methacrylate resins, polyolefins, polystyrenes, acrylonitrile resins, polyethers, polyesters, polyamides, polyurethanes, polycarbonates, cellulose derivative resins, synthetic rubber resins and the like. It is preferred to use homopolymers or copolymers of a polymerizable monomer having an α, β-unsaturated double bond, such as a vinyl halide, vinylidene halide, vinyl acetate, acrylate, methacrylate, ethylene, propylene, butylene, butadiene, styrene, acrylonitrile, acetoaldehyde and the like. It is especially preferred to use homopolymers or copolymers of vinylchloride, methyl methacrylate, sytrene and the like, including copolymers made of a main component of said monomers and other comonomers. It is also possible to include a conventional additive such as a stabilizer, a filler, a coloring agent, a plasticizer, a flameproofing agent, a lubricant, etc. in the thermoplastic resin, if desirable. In such a case, the amount of the thermoplastic resin in the product is calculated by including the amount of the additives.

The composite noise absorption product can be prepared by impregnating the thermoplastic resin into the fiber web and treating the resulting product, simultaneously or later, so as to bond them, forming many fine cracks on the surface of the product. The treatment for forming many fine cracks is characterized by melting or dissolving the thermoplastic resin on the surface and then cooling or removing the solvent to solidify the thermoplastic resin. At least the surface of the composite product is expanded or dissolved by the melting or dissolving of the thermoplastic resin whereby an increase of volume is caused. When the thermoplastic resin is solidified, a decrease of volume is caused by the contraction of the thermoplastic resin or the solvent removal, whereby many fine cracks are formed. When the melted thermoplastic resin or the solution of the thermoplastic resin in solidified, surface tension is produced on the thermoplastic resin above the fibers or above the space between the fibers, so as to form the fine cracks. A typical embodiment of the preparation of the product of this invention is characterized by impregnating a solution or a dispersion of the thermoplastic resin into the fiber web and drying it. In the case where a solution of the thermoplastic resin is used, many fine cracks are formed on the surface by removing the solvent from the solution of the resin impregnated in the fiber web by heating or by some other manner. When a dispersion such as an emulsion or a suspension of the thermoplastic resin is impregnated into the fiber web and the medium is removed by heating, etc., many fine cracks are formed by partially melting the thermoplastic resin on the surface by heating in the drying process and then cooling so as to form the cracks. It is also possible to add a small amount of a solvent in order to swell or dissolve the thermoplastic resin in the dispersion and then to remove the solvent in the drying process so as to form the cracks.

An alternative embodiment of the preparation of the product of this invention is characterized by admixing fibers in a dispersion of the thermoplastic resin and removing the medium to form a composite of the fiber and the thermoplastic resin and then treating it as above so as to form cracks on the surface. The composite is formed with or without adding the solvent to the dispersion, and the cracks are formed by heating or by some other manner. Another embodiment of the preparation of this invention is characterized by admixing a powder of the thermoplastic resin with the fiber web and then treating by heat-melting or with a solvent so as to form cracks or crevices on the surface. Once a composite product is formed, crevices are formed by melting or dissolving the thermoplastic resin on the surface and cooling or removing the solvent. It is possible to include an additive such as an emulsifier, a suspension stabilizer, an additive for the thermoplastic resin, a solvent for the thermoplastic resin, and the like in the dispersion, such as an emulsion or a suspension. It is sometimes necessary to add a solvent to the dispersion. The medium for the dispersion is usually water. The amount of the solvent is not critical and is preferably 30 – 5 wt% relative to the weight of the thermoplastic resin in the dispersion. When the amount of the solvent is greater than 30 wt%, the stability of the dispersion may be low and the viscosity high. When the amount of the solvent is less than 5%, the effect of the solvent is decreased. The solvent can be selected, depending upon the type of the thermoplastic resin, from those solvents which are suitable for dissolving or swelling the resin. Suitable solvents include hydrocarbons, e.g., benzene, toluene, ethyl benzene, diethyl benzene, heptane and the like; halohydrocarbons, e.g., carbon tetrachloride, dichloroethane, hexachloroethane, perchloroethylene, chlorobenzene and the like; ketones, e.g., acetone, methylethyl ketone, diethyl ketone, cyclohexanone and the like; esters, e.g., butyl acetate, amyl acetate, dimethyl phthalate and the like; ethers, e.g., dioxane, tetrahydrofuran and the like. It is also effective to add a polymerizable monomer which dissolves or swells the thermoplastic resin, such as styrene, divinylbenzene, methyl acrylate, methyl methacrylate, vinyl acetate, acrylonitrile, glycidyl methacrylate, ethylene glycol dimethacrylate and the like.

The composite noise absorption product of this invention has a minimum specific flow resistance in the range of 0.5 – 2 which is measured by the method of ASTM C522-69 using the following equation:

$$R_f = \frac{\Delta p}{u} \text{(mks rayls)}$$

wherein
Rf: specific flow resistance
$\Delta p$: applied air pressure differential measured between the two sides of the layer (mm H$_2$O)
$u$: velocity through and perpendicular to the two faces of the layer (m/sec)

The composite noise absorption product of this invention has a specific flow resistance which decreases with an initial increase of flow velocity, then reaches a minimum and thereafter increases with further increase of flow velocity.

Having generally described the invention, a more complete understanding can be obtained by reference to certain specific examples, which are included for purposes of illustration only and are not intended to be limiting unless otherwise specified.

EXAMPLE 1

Figure 3:
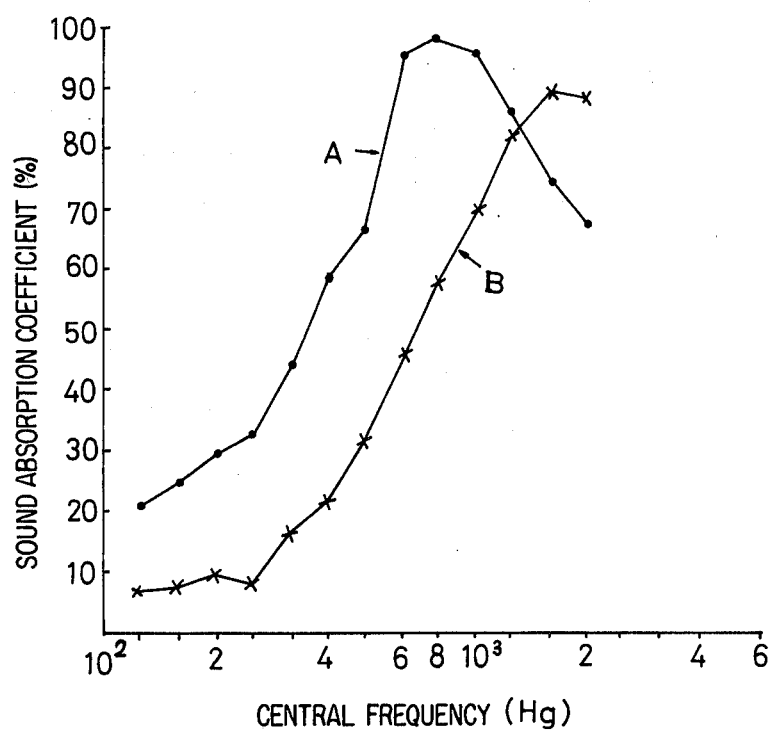
FIG. 3 shows the sound absorption coefficients of the product of this invention (A) and of a conventional product (B).

200 wt parts of an emulsion of polyvinyl chloride having an average molecular weight of about 1200 (total solid content of 49 wt%) was admixed with 20 wt parts of xylene, 3 wt parts of an organotin type stabilizer and 0.8 wt parts of ammonium laurate to form a uniform emulsion. A glass fiber chopped strand mat (380 g/m$^2$) was dipped into the emulsion and was removed and dried at 120° C for 10 minutes to obtain a hard, porous board having a thickness of 1.6 mm and a glass fiber content of about 35 wt%. The porous board had a porosity of about 40% and an apparent specific gravity of 0.8 g/cm$^3$, FIG. 1 is a photograph of the surface taken by a microscope (35 times) and FIG. 2 is a photograph of the surface taken by a scanning electron microscope (500 times). The sound absorption coefficient (vertical incident acoustic absorbing coefficient) of the noise absorption product was measured by Japanese Industrial Standard A-1405 (1963) (air space 60 mm). The results are shown in FIG. 3 by curve A. The noise reduction coefficients (average sound absorption coefficient of 250 – 2000 c/s in 1/3 octave) was 73%. As a reference, the sound absorption coefficient of a commercial noise absorption product made of glass fiber was measured. The resuls are shown in FIG. 3 by curve B.

EXAMPLE 2

40 kg of an emulsion of polyvinyl chloride (total solid content of 50 wt%) was maintained under stirring and 4 kg of dichloroethane and 0.6 kg of organotin type stabilizer were added to it. A glass fiber chopped strand mat (380 g/m$^2$) was dipped into the emulsion mixture, was removed and squeezed through two rubber rollers and was dried at 120° C for 20 minutes to obtain a hard, porous board having a thickness of about 1.7 mm, and a glass fiber content of 35.4 wt% which had high rigidity and strength. The noise reduction coefficient of the porous board was 78%.

EXAMPLE 3

Various type glass fiber materials were treated with the emulsion of polyvinyl chloride of Example 1 to obtain various composite acoustic absorption products. The noise reduction coefficients of the glass fiber materials alone were compared with those of the composite noise absorption products. The results are shown in Table 1.

TABLE 1

| Type of glass fiber material | Glass fiber material apparent specific gravity (g/m$^2$) | NRC* (%) | Composite noise absorption material glass fiber content (%) | NRC (%) |
| --- | --- | --- | --- | --- |
| chopped strand mat | 360 | 28 | 35 | 61 |
| continuous strand mat | 450 | 9 | 22 | 73 |
| woven cloth | 213 | 8 | 63 | 48 |
| surfacing mat | 60 | 10 | 10 | 52 |

*NRC: noise reduction coefficient

As is clear from Table 1, the noise reduction coefficients of the composite noise absorption products were much higher than those of the fiber materials and there is essentially no relationship between them.

EXAMPLE 4

A mixture of 1 kg of toluene and 0.15 kg of organotin type stabilizer was gradualy added to 10 kg of an emulsion of a copolymer of vinyl chloride and methyl acrylate (total solid content of 35 wt%) with stirring. A fiber web prepared by piling a woven fabric on a glass fiber chopped strand mat having an apparent specific gravity of 500 g/m$^2$ was dipped into said emulsion mixture, was removed and squeezed through two rubber rollers and was dried to obtain a composite noise absorption product having a glass fiber content of 42.1%. The noise reduction coefficient of the product was 72%.

EXAMPLE 5

An emulsion containing 0.4 kg of ethyl benzene, 25 g of potassium oleate and 265 g of water was admixed with the emulsion of the copolymer of Example 2. The emulsion mixture was poured into a vessel to make a bath. A glass fiber chopped strand mat was continuously passed through the bath at a velocity of 15 m/hour so as to impregnate the emulsion mixture. The amount of the emulsion mixture impregnated in the mat was controlled by a doctor knife. The impregnated mat was passed through an oven kept at 90° C for 12 minutes to obtain a continuous composite noise absorption product having a glass fiber content of 39.5%. The noise reduction coefficient of the product was 73%.

EXAMPLE 6

An emulsion of 5 g of xylene, 5 g of water and 0.5 g of polyoxyethylene lauryl ether was admixed with 50 g of an emulsion of polyvinylidene chloride (total solid content of 50 wt%) with stirring. The glass fiber chopped strand mat of Example 1 was dipped into the emulsion mixture, was removed and squeezed and was dried at 70° C for 5 minutes and, then, at 110° C for 10 minutes to obtain a composite noise absorption product having a glass fiber content of 38.5%. The noise reduction coefficient of the product was 68%.

EXAMPLE 7

An emulsion of 10 g of toluene, 10 g of water and 1 g of polyoxyethylene lauryl ether was admixed with 100 g of an emulsion prepared by the emulsion polymerization of methyl methacrylate (total solid content of 50 wt%) with stirring. The glass fiber material of Example 1 was dipped into the emulsion mixture, was taken up and squeezed and dried at 50° C for 2 hours. It then was washed with hot water and was dried at 100° C for 15 minutes to obtain a composite noise absorption product having a glass fiber content of 36.4%. The noise reduction coefficient of the product was 61%.

EXAMPLE 8

In accordance with the process of Example 7, except for using separately emulsions of polystyrene, acrylonitrile-butadiene-styrene copolymer (ABS) or styrene-butadiene copolymer (SB), composite noise absorption products were obtained. The results are shown in Table 2.

TABLE 2

| Type of resin | Condition of drying | Glass fiber content | NRC |
| --- | --- | --- | --- |
| polystyrene | 120° C, 50 min. | 34.8% | 55% |

TABLE 2-continued

| Type of resin | Condition of drying | Glass fiber content | NRC |
|---|---|---|---|
| ABS | 70° C, 1.5 hr. | 50.9% | 66% |
| SB | air dry | 38.5% | 56% |

EXAMPLE 9

A mat of staple fibers of acetate fiber and nylon fiber (1:1) was dipped into the emulsion mixture of Example 7, was removed and squeezed and dried at 80° C for 10 minutes, was washed with hot water and was dried at 80° C to obtain a composite noise absorption product having a fiber content of 48%. The noise reduction coefficient of the product was 78%.

EXAMPLE 10

A powder prepared by drying the emulsion mixture of Example 1 was scattered on a mat of staple fibers of acetate fiber and nylon fiber (1:1). The treated mat was dipped in the emulsion mixture and was removed and squeezed through two rubber rollers and was dried at 80° C for 20 minutes to obtain a composite noise absorption product having a fiber content of 33.6%. The noise reduction coefficient of the product was 68%.

EXAMPLE 11

25 wt parts of glass fiber roving which was cut to a length of 2.5 cm was admixed with 100 wt parts of the emulsion mixture of Example 1. The mixture was placed on a flat wire net and was dried in an oven at 120° C for 30 minutes to obtain a composite porous noise absorption product. The noise reduction coefficient of the product was 75%.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a composite noise absorption product of a hard board containing a fiber web and a thermoplastic resin, the improvement characterized in that the surface and spaces between the fiber web are covered and filled with the resin, and wherein a plurality of finely formed crevices is formed in the resin covering th surface of the composite.

2. The composite noise absorption product of claim 1, wherein the fiber content is 15 – 70 wt% and the thermoplastic resin content is 30 – 85 wt%.

3. The composite noise absorption product of claim 1, wherein the fiber material is an inorganic fiber.

4. The composite noise absorption product of claim 1, wherein the fiber web is glass fiber mat or roving.

5. The composite noise absorption product of claim 1, wherein the thermoplastic resin is a polymer produced by polymerizing an ethylenically unsaturated monomer.

6. The composite noise absorption product of claim 1, wherein the thermoplastic resin is a homopolymer of a copolymer of vinyl chloride.

7. The composite noise absorption product of claim 1, which has an average thickness of less than 5 mm, a porosity of less than 80% and an apparent specific gravity of higher than 0.4 g/cm$^3$.

8. The composite noise absorption product of claim 7 which has an average thickness of 3 – 0.1 mm; a porosity of 60 – 10%; and an apparent specific gravity of 0.6 – 1.2 g/cm$^3$.

9. An acoustically absorbing element comprising the noise absorbing product of claim 1.

10. In a composite noise absorption product of a hard board containing a glass fiber-chopped strand mat and a polyvinyl chloride thermoplastic resin, the improvement characterized in that the surface and spaces between the fiber web is covered and filled with the resin, and wherein a plurality of finely formed crevices is formed in the resin covering the surface of the composite.

* * * * *